United States Patent Office 3,414,612
Patented Dec. 3, 1968

3,414,612
METHOD FOR PREPARING ACYL FLUORIDES
Henry H. Tan and Elmore L. Martin, Wilmington, Del., assignors to E. I. du Pont de Nemours and Company, Wilmington, Del., a corporation of Delaware
No Drawing. Filed Dec. 29, 1964, Ser. No. 421,989
6 Claims. (Cl. 260—544)

ABSTRACT OF THE DISCLOSURE

Process of carbonylating either tertiary butyl chloride or bromide or 1,2-dichloro or dibromo-2-methylpropane, with carbon monoxide using anhydrous hydrogen fluoride as a catalyst, at from 0 to 75° C. and a pressure of from 10 to 1,000 atmospheres to produce the corresponding 2,2-disubstituted propionyl fluoride.

This invention relates to the synthesis of acyl fluorides. More specifically, it relates to an improved method for the preparation of 2,2-disubstituted-propionyl fluorides.

A well known method for the preparation of acyl fluorides employs the reaction between acyl chlorides and certain inorganic fluorides. Another method of preparing acyl fluorides is by reacting secondary organic chlorides or bromides with carbon monoxide in the presence of boron trifluoride as catalyst, and hydrogen fluoride as shown in U.S. Patent No. 2,570,793 issued Oct. 9, 1953 to W. F. Gresham and I. D. Webb. Still another method of preparing acyl fluorides is by reacting tertiary chlorides and bromides with carbon monoxide in the presence of a catalyst, e.g., boron trifluoride, and hydrogen fluoride at −25° C. to +200° C. and elevated pressures as shown in U.S. Patent No. 2,580,070 issued Dec. 25, 1951 to R. E. Brooks and I. D. Webb.

These methods suffer primarily from the disadvantage of requiring the presence of a catalyst such as boron trifluoride in addition to hydrogen fluoride to afford the desired acyl fluoride.

An object of this invention is to provide an improved method for the synthesis of acyl fluorides. A particular object of this invention is to provide an improved method for the synthesis of 2,2-disubstituted-propionyl fluorides under mild conditions.

These and other objects are accomplished by reacting anhydrous hydrogen fluoride and carbon monoxide with an alkyl halide selected from the class consisting of tertiary-butyl chloride, tertiary-butyl bromide, 1,2-dichloro-2-methylpropane, and 1,2-dibromo-2-methylpropane, at temperatures of from 0° to 75° C. and elevated pressures, whereby a corresponding 2,2-disubstituted-propionyl fluoride is produced and thereafter separated from the resulting product mixture.

The process of the present invention proceeds in presence of hydrogen fluoride without any additional catalytic component such as boron trifluoride. Above all, this benefit is obtained, most unexpectedly, at low temperatures and pressures with the space-time yields being equal to or greater than those previously obtained by other methods.

The amount of anhydrous hydrogen fluoride employed in the process of the present invention can be expressed in moles per mole of the particular alkyl halide used in the reaction. Ratios of 2 to 20 can be employed with 4 to 10 preferred.

The process of the present invention may be carried out at temperatures ranging from 0° to 75° C. with a range from 20° to 60° C. being preferred. Temperatures higher than 75° C. greatly diminish the yield of the 2,2-disubstituted-propionyl fluoride obtained in the reaction.

The amount of pressure which is employed in the process of the present invention may be varied from about 10 to 1000 atmospheres but preferably is kept in the range of 50 to 300 atmospheres.

Reaction times are generally in the order of 15 to 180 minutes but periods of up to 24 hours may be used.

The major product in the reaction mixture obtained by the process of the present invention is pivalyl fluoride, chloropivalyl fluoride, or bromopivalyl fluoride depending upon the nature of the alkyl halide employed in the reaction mixture. Some of the corresponding acyl chloride or bromide is formed at the higher reaction pressures; however, yields of 85% or greater of the acyl fluorides are obtained when carrying out the reaction in the preferred lower pressure range.

Any suitable method for the isolation of the 2,2-disubstituted-propionyl fluorides from the reaction product mixture may be employed with the present invention. Furthermore, the process may be operated either batchwise or continuously. For example, the excess hydrogen fluoride and by-product hydrogen chloride can be removed by distillation from the reaction mixture and the hydrogen fluoride recycled after removal of hydrogen chloride. The residue can then be further reacted by solvolysis to convert the acyl fluoride to the corresponding acid, esters, and amides.

The following examples are illustrative of the invention.

EXAMPLE I

A stainless steel reactor having a capacity of 310 ml., mounted on a rocker assembly, is purged with nitrogen. The reactor is charged with 31.8 grams (0.25 mole) of 1,2-dichloro-2-methylpropane. The system is then sealed, cooled to between −60° and −70° C., evacuated, purged with nitrogen repeatedly, and finally charged with 60 grams (3 moles) of liquid hydrogen fluoride. The reactor is then agitated, heated to 50° C., and pressured to 300 atmospheres with carbon monoxide, following which an injection to the reactor of 100 ml. of dichloromethane is made. These conditions are maintained for 2 hours. After this time, the resulting solution of the acyl fluoride is washed with water and dried over anhydrous sodium sulfate. Gas chromatographic analysis indicates a yield of 29.4 grams of chloropivalyl fluoride. Gas chromatographic analysis, as used in this disclosure, refers to the well-known procedure of passing a vapor in a carrier gas through a column of suitable absorbant phase supported by the walls of the tube or by particulate matter. The carrier gas elutes the materials being analyzed in a reproducible time dependent manner. See, for example, "Gas-Liquid Chromatography" by Dal Nogare and Juvet, published by Interscience Publishers, 1962. In order to obtain precise quantitative results, each column and procedure must be calibrated against known mixtures in the concentration range to be encountered with the test samples. In the results herein reported, the major eluted peaks were identified by trapping, followed by infra-red, nuclear magnetic resonance, mass spectrometry, etc., identification. Known mixtures were then prepared and passed through the column for calibration purposes.

EXAMPLE II

This example represents a series of runs in which the time and pressure are varied as set forth in Table I. In each case, a stainless reactor having a capacity of 310 ml., mounted on a rocker assembly, is purged with nitrogen and charged with 31.8 grams (0.25 mole) of 1,2-dichloro-2-methylpropane. The system is cooled to between −60° and −70° C., evacuated, purged with nitrogen repeatedly, and finally charged with 60 grams (3 moles) of liquid hydrogen fluoride. The reactor is then agitated, heated to 40° C., and pressured with carbon monoxide to the pressure set forth in Table I, following which an injection to the reactor of 100 ml. of dichloromethane is made. These conditions are maintained for the time indicated in Table I. After this time, 0.75 mole of water is injected and the agitation maintained for an additional 15 minutes to facilitate complete hydrolysis of the acid fluoride. The pressure in the reactor is reduced to one atmosphere by bleeding off the gases and then increased to 50 p.s.i. by injecting nitrogen into the system. The reactor is then inverted and the product discharged onto ice. The precipitated chloropivalic acid product is then dissolved in dichloromethane and the aqueous phase extracted several times with dicholormethane. The dichloromethane extracts are then combined, water washed, and dried over anhydrous sodium sulfate. The chloropivalic acid product is then obtained in pure form by distillation. The percent conversion of 1,2-dichloro-2-methylpropane to chloropivalic acid via chloropivalyl fluoride is reported in Table I.

TABLE I

| Time (min.) | Percent conversion to chloropivalic acid | | | |
|---|---|---|---|---|
| | 50 atm., percent | 100 atm., percent | 200 atm., percent | 300 atm., percent |
| 25 | 60 | 66 | 74 | 91 |
| 35 | 63 | 69 | 78 | 93 |
| 45 | 66 | 71 | 80 | 14 |
| 75 | 71 | 77 | 87 | 96 |

EXAMPLE III

The procedures and quantities of materials used in Example III are identical to those used in Example II, except that the pressure is maintained constant and the amount of hydrogen fluoride injected is varied. In Table II, the temperature was maintained at 40° C., and the pressure at 50 atmospheres.

TABLE II

| Time (min.) | Percent conversion to chloropivalic acid with varying HF/1,2-dichloro-2-methylpropane mole ratios | | |
|---|---|---|---|
| | 4:1, percent | 8:1, percent | 12:1, percent |
| 25 | 29 | 60 | 78 |
| 35 | 30 | 63 | 81 |
| 45 | 31 | 66 | 84 |
| 75 | 33 | 71 | 91 |

In Table III, the temperature is maintained at 40° C., and the pressure at 100 atmospheres.

TABLE III

| Time (min.) | Percent conversion to chloropivalic acid with varying HF/1,2-dichloro-2-methylpropane mole ratios | | |
|---|---|---|---|
| | 4:1, percent | 8:1, percent | 12:1, percent |
| 25 | 37 | 66 | 81 |
| 35 | 45 | 69 | 90 |
| 45 | 50 | 71 | 91 |
| 75 | 57 | 77 | 92 |

EXAMPLE IV

This example demonstrates the influence of time and temperature on the conversion of 1,2-dichloro-2-methylpropane chloropivalic acid via chloropivalyl fluoride using this process when operating at a constant pressure and reactant ratio of 8:1. Table IV summarizes the results of these experiments.

TABLE IV

| Time (min.) | Percent conversion at 100 atm./40° C., percent | Percent conversion at 100 atm./60° C., percent |
|---|---|---|
| 25 | 66 | 76 |
| 35 | 69 | 83 |
| 45 | 71 | 85 |
| 75 | 77 | 93 |

EXAMPLE V

A 400 ml. stainless steel shaker tube is cooled, evacuated and 120 g. of anhydrous hydrogen fluoride is added. The 1,2-dichloro-2-methylpropane (96 g., 90 ml.) is injected at a rate of 1.5 ml. per minute at 60° C. and an initial pressure of 200 atmospheres of carbon monoxide. After cooling to room temperature, the excess carbon monoxide (the pressure drops to 175 atm. at the end of the run) is bled off slowly and the contents of the tube are transferred to a polyethylene container. The resulting hydrogen fluoride solution is poured onto a mixture of excess ice and 50 ml. of dichloromethane. The organic layer is separated and the aqueous layer is extracted three additional times with 75–80 ml. portions of dichloromethane. The combined dichloromethane extracts are washed once with a saturated sodium chloride solution and dried with anhydrous magnesium sulfate. A small amount of sodium fluoride is added to remove trace amounts of hydrogen fluoride. The inorganic reagents are removed by filtration and the filtrate is concentrated at atmospheric pressure on a steam bath. Distillation of the residue gives 98 grams (96%) of chloropivalyl fluoride, $n_D^{25}$ 1.3994.

EXAMPLE VI

A 240 ml. Hastelloy reaction vessel is flushed with nitrogen and charged with 39 grams (approximately 0.31 mole) of 1,2-dichloro-2-methylpropane, 100 grams (5 moles) of hydrogen fluoride, and carbon monoxide sufficient to maintain a pressure of 930–950 atmospheres. The reaction mixture is heated to 35–37° C. and agitated for 17 hours. After cooling to room temperature, the excess carbon monoxide is bled off slowly, and the contents are emptied into a polyethylene container. Most of the hydrogen fluoride is removed by the passage of dry nitrogen through the reaction mixture. Distillation of the residue yields 24 grams of chloropivalyl fluoride, boiling point 68–70° C. at 100 mm. and chloropivalyl chloride, boiling point 95–100° C. at 100 mm. This represents yields of 56% and 10%, respectively, of the chloropivalyl fluoride and chloropivalyl chloride.

EXAMPLE VII

Using the procedure of Example II, 23.2 grams (0.25 mole) of tertiary-butyl chloride and 40 grams (2 moles) of hydrogen fluoride are reacted at 40° C. under 50–100 atmospheres of carbon monoxide. A yield of 95% pivalic acid at a 90% conversion of tertiary-butyl chloride is obtained.

EXAMPLE VIII

A pressure tube is charged with 15.2 grams (0.12 mole) of 1,2-dichloro-2-methylpropane and 20 grams (1.0 mole) of hydrogen fluoride is added. Carbon monoxide is then pumped in to 500 atmospheres at 20° C. The bomb is agitated at 20° C. for five hours, after which it is cooled in a Dry Ice bath and slowly bled to remove excess gaseous material. The contents of the bomb are poured into an excess of water and the mixture steam distilled to yield a distillate which is extracted with dichloromethane. The extracts are combined and dried over anhydrous sodium sulfate. After removal of the solvent, 7.5 grams (46%) of chloropivalic acid is obtained. Extraction of the residue from the steam distillation with dichloromethane gives after work up, 4.1 grams (30%) more chloropivalic acid. Total yield is 11.6 grams (76%). The chloropivalic acid obtained by this procedure is identified by mixed melting point determination with an independently prepared sample of chloropivalic acid and by comparison of their infrared spectra.

EXAMPLE IX

In a pressure bomb is placed 63.5 grams (0.5 mole) of 1,2-dichloro-2-methylpropane and 60 grams (3.0 moles) hydrogen fluoride. The bomb is pressured to 350 atmospheres at 20° C. with carbon monoxide. The temperature is raised to 35° C. and the bomb is agitated at this temperature for three hours. It is then cooled in a Dry Ice bath and bled carefully. The product is collected in a polyethylene jar. The crude product is poured into a beaker containing crushed ice and stirred. The organic material is extracted with ether and dried over anhydrous sodium sulfate. After removal of solvent, the residue is distilled to give 53.3 grams (78% yield) of chloropivalic acid, M.P. 41–43° C.; recrystallized from n-heptane, M.P. 43–44° C. Mixed with a sample of chloropivalic acid, the product shows no melting point depression.

EXAMPLE X

Using the procedure of Example IX, a mixture of 0.3 mole (64.7 grams) of 1,2-dibromo-2-methylpropane and 3 moles (60 grams) hydrogen fluoride is charged to a pressure bomb. The bomb is pressured to 500 atmospheres with carbon monoxide at 20° C. for five hours. After cooling the bomb, removing the excess hydrogen fluoride, and pouring the resultant reaction mixture into water, a 65% yield (35.3 grams) of bromopivalic acid (M.P.=52–53° C.) is recovered. Prior to hydrolyzing the reaction mixture, (which contained the bromopivalyl fluoride), a portion thereof is slowly poured with vigorous stirring into a beaker containing cold (−5–0° C.), concentrated ammonium hydroxide, yielding on isolation and recrystallization, bromopivalamide, M.P.=113–115° C.

EXAMPLE XI

A shaker tube is cooled to −60° C., and evacuated, and 31.8 grams of 1,2-dichloro-2-methylpropane is injected, followed by 60 grams of anhydrous hydrogen fluoride. The shaker tube is maintained at 50° C. for two hours, during which time it is pressured to 300 atmospheres with carbon monoxide. After this time, the shaker tube is vented and the contents discharged onto ice. The chloropivalyl fluoride is dissolved in dichloromethane. Gas chromatographic analysis indicates a yield of 29.4 grams of chloropivalyl fluoride and 2.2 grams of chloropivalic acid.

The three compounds preparable by the process of the present invention, pivalyl fluoride, chloropivalyl fluoride, and bromopivalyl fluoride are useful as chemical intermediates, in the formation of esters, amides and salts, which are useful as lubricants and plasticizers. Both the chloropivalic acid and bromopivalic acid can be reacted in the presence of basic catalysts to form pivalolactone.

It can be seen that the applicants have provided an improved process for the preparation of pivalyl fluoride, chloropivalyl fluoride, and bromopivalyl fluoride. Various modifications within the spirit of this invention will occur to those skilled in the art and it is intended that all such are to be included within the scope of the following claims.

We claim:
1. A process which consists essentially of contacting anhydrous hydrogen fluoride and an alkyl halide, selected from the class consisting of tertiary-butyl chloride, tertiary-butyl bromide, 1,2-dichloro-2-methylpropane, and 1,2-dibromo-2-methylpropane, with carbon monoxide at a temperature of from 0° to 75° C. at a pressure of from 10 to 1,000 atmospheres, and recovering a 2,2-disubstituted-propionyl fluoride selected from the class consisting of pivalyl fluoride, chloropivalyl fluoride, and bromopivalyl fluoride.

2. The method of claim 1 wherein the molar ratio of anhydrous hydrogen fluoride to the alkyl halide is from 2:1 to 20:1.

3. A process which consists essentially of contacting anhydrous hydrogen fluoride and tertiary-butyl chloride in a molar ratio of from 4:1 to 10:1, with carbon monoxide at a temperature of from 0° to 75° C. and a pressure of from 10 to 1,000 atmospheres, and recovering pivalyl fluoride.

4. A process which consists essentially of contacting anhydrous hydrogen fluoride and tertiary-butyl chloride in a molar ratio of from 4:1 to 10:1 with carbon monoxide at a temperature of from 20° to 60° C. and a pressure of from 50 to 300 atmospheres, and recovering pivalyl fluoride.

5. A process which consists essentially of contacting anhydrous hydrogen fluoride and 1,2-dichloro-2-methylpropane, in a molar ratio of from 4:1 to 10:1 with carbon monoxide at a temperature of from 20° to 60° C. and a pressure of from 50 to 300 atmospheres, and recovering chloropivalyl fluoride.

6. A process which consists essentially of contacting anhydrous hydrogen fluoride and 1,2-dibromo-2-methylpropane, in a molar ratio of from 4:1 to 10:1, with carbon monoxide at a temperature of from 20° to 60° C. and a pressure of from 50 to 300 atmospheres, and recovering bromopivalyl fluoride.

References Cited

UNITED STATES PATENTS

| | | | |
|---|---|---|---|
| 2,580,070 | 12/1951 | Brooks et al. | 260—544 |
| 2,831,877 | 4/1958 | Koch | 260—544 XR |
| 2,864,858 | 12/1958 | Schneider | 260—514 |

OTHER REFERENCES

Friedman et al.: J. Org. Chem. (1962), vol. 27, pp. 481–487.

LORRAINE A. WEINBERGER, *Primary Examiner.*

J. H. NIELSEN, *Assistant Examiner.*